(12) United States Patent
Richardson et al.

(10) Patent No.: US 8,082,646 B2
(45) Date of Patent: Dec. 27, 2011

(54) APPARATUS AND SYSTEM FOR INSTALLING RIVETS IN BELT FASTENERS

(76) Inventors: Thomas W. Richardson, Hinsdale, IL (US); Mary Jane Richardson, Hinsdale, IL (US)

(*) Notice: Subject to any disclaimer, the term of this patent is extended or adjusted under 35 U.S.C. 154(b) by 0 days.

(21) Appl. No.: 12/348,227

(22) Filed: Jan. 2, 2009

(65) Prior Publication Data

US 2009/0106972 A1    Apr. 30, 2009

Related U.S. Application Data

(62) Division of application No. 11/397,207, filed on Apr. 4, 2006, now Pat. No. 7,493,682.

(51) Int. Cl.
*B23P 11/00* (2006.01)

(52) U.S. Cl. ....... 29/243.51; 29/798; 227/147; 227/139; 227/119

(58) Field of Classification Search ............ 29/432, 29/464, 525.06, 34 B, 798, 243.51, 281.5; 227/119, 139, 147; 221/260, 307, 22, 23, 221/29, 267
See application file for complete search history.

(56) References Cited

U.S. PATENT DOCUMENTS

| | | | | |
|---|---|---|---|---|
| 2,786,202 A | * | 3/1957 | Gaulke | 227/147 |
| 2,839,754 A | * | 6/1958 | Pfaff | 227/147 |
| 3,134,981 A | * | 6/1964 | Demetrakopoulos et al. | 227/112 |
| 3,854,648 A | * | 12/1974 | Inzoli et al. | 227/136 |
| 4,065,045 A | * | 12/1977 | Pray | 227/147 |
| 4,620,657 A | * | 11/1986 | Gladding et al. | 227/147 |
| 4,688,711 A | * | 8/1987 | Gladding et al. | 227/147 |
| 5,487,217 A | * | 1/1996 | Richardson et al. | 29/816 |
| 5,524,808 A | * | 6/1996 | Vogrig | 227/147 |
| 5,680,790 A | * | 10/1997 | Richardson et al. | 72/462 |

* cited by examiner

*Primary Examiner* — David Bryant
*Assistant Examiner* — Christopher Koehler
(74) *Attorney, Agent, or Firm* — Seyfarth Shaw LLP

(57) ABSTRACT

A system for splicing a conveyor belt with belt fasteners is disclosed. A base assembly aligns the belt, belt fasteners and rivet holes thereof with swage structures for securing the rivets. A guide assembly has a rigid guide block with cylindrical pilot holes, and a guide membrane of resilient material. Guide pins are receivable by guide bores for aligning the base and guide assemblies with the pilot holes, rivet holes, and swage structures in registry. The guide membrane including openings aligned with the pilot holes. The openings have a pair of slits defining flaps deflectable to permit the rivet to pass therethrough, and a central hole or cut-out. The flaps and the cut-out assist in centering the rivet with the belt fastener rivet holes. The system uses a single-rivet driver, a multi-rivet driver, a pneumatic driver, or an electric hammer.

4 Claims, 14 Drawing Sheets

APPARATUS AND SYSTEM FOR INSTALLING RIVETS IN BELT FASTENERS

CROSS-REFERENCE TO RELATED APPLICATION

This application is a divisional of prior application Ser. No. 11/397,207, filed Apr. 4, 2006 now U.S. Pat. No. 7,493,682, titled "Apparatus and System for Installing Rivets in Belt Fasteners," the entirety of which is incorporated herein by reference.

FIELD OF THE INVENTION

The invention relates to installing rivets in belt fasteners and, in particular, to a system and tools for installing rivets in belt fasteners for conveyor belts.

BACKGROUND

Currently, there are a number of systems known and utilized for installing rivets in belt fasteners for coupling portions of a conveyor belt. In a simple form, a conveyor belt is a loop formed by a strip of conveyor belt material having two ends that are connected or coupled together. The connection or coupling is referred to as a belt splice, particularly when the connection is used to repair a broken portion of the belt. The belt material is often formed from a relatively hard, though flexible, rubber material and a number of layers typically including at least one webbing layer. The rubber provides flexibility and rigidity while the webbing layer minimizes or controls stretching, for instance. In this manner, the belt material is formed so as to maintain a general length and shape, particularly when installed on a pulley system and stressed during service.

The service demands of the conveyor belt require a relatively strong, yet flexible, connection or splice between the belt ends. Accordingly, the ends are commonly coupled, hinge-like, by opposed belt fasteners which are then threaded or coupled with a hinge pin.

To accept the hinge pin, the belt fasteners form a general U-shape or V-shape so they have has opposed side portions connected by a bend. The belt fasteners are connected to the belt ends with rivets having a head against a first side portion of the belt fastener, a shank passing through an opening in the first side portion of the belt fastener and through the belt material, and a swage end passing through an opening in a second side portion of the belt fastener and deformed around the opening.

The secured belt fasteners thus act as hinge knuckles. Each belt end has one or more belt fasteners secured with the belt so that the bend of the U-shape provides a lateral passage. The belt fasteners of opposite belt ends are positioned so that their respective lateral passages are aligned for receiving the hinge pin therein.

Optimal belt performance is related to proper connection between the belt ends and, hence, between the belt fasteners with the belt ends. The thickness of various belts may range, for instance, from one-eighth of an inch to over an inch. The rivets are provided with a frangible or releasable pilot nail shank for perceiving the belt material as the rivet is driven through. For driving, a central longitudinal axis of the rivet is aligned with the openings in the first and second opposed side portions of the belt fastener and then driven through. The driving not only drives the rivet through the belt material but also swages the rivet around the second opening. This requires a significant amount of force which, if not properly applied, may result in misalignment of the rivets with the belt fastener openings. That is, if the rivet is not started in the proper plane or at the proper angle, and is struck by this large force, it will miss the opening in the second side portion.

One manner known for aligning the rivets prior to and during driving is utilizing a guide block. The known guide block is formed of rubber or the like with one or more pilot holes. The guide block pilot is placed over the belt fastener so that the pilot holes are aligned with belt fastener openings. Each pilot hole is tapered inwardly so that the rivet is generally constrained and directed towards a center point of the belt fastener openings as the rivet is being driven, the lowest portion of the pilot hole being smaller than the pilot nail shank, which itself is smaller than the rivet head that also must pass through the guide block.

In order to facilitate the rivet passing through the guide block, particular lubricants are required within the pilot hole. These lubricants are selected to minimize chemical interaction between the lubricant or, rather, chemical attack by the lubricant against the guide block. Nonetheless, as these guide blocks are often used in repair situations deep within an underground mine where organic materials such as coal and methane gas are prevalent, the guide blocks are susceptible to chemical attack and damage from their environment alone.

The forces required in driving the rivets often result in damage to the guide blocks. As the lowest portion of the pilot hole is smaller than the pilot nail shank, forcing the shank through the hole causes at least cyclic damage. The rubber of the guide block is at least slightly deformable, and an improperly aligned driving tool used with a hammer, such as a single rivet driver and a 1-pound hammer, cause additional damage. However, of greater concern is the use of non-manual or powered driving tools, such as a pneumatic hammer.

A pneumatic hammer uses a series of blows to drive the rivet into and through belt and belt fasteners. Depending on the type of pneumatic hammer, a rivet may be secured with 3-5 large blows, or 3000-5000 smaller blows. In any event, this requires a large amount of air and produces impulse forces which cause significant damage to the guide block within the pilot holes. Within a finite number of uses, the guide block is useless because the damage to the interior of the pilot holes has not only removed the inward taper but also resulted in an outward taper.

As it is undesirable and expensive to simply treat the guide blocks as disposable, one approach for providing a guide for a pneumatic hammer is shown and described in U.S. Pat. No. 5,487,217, to Richardson, et al. The '217 patent shows use of a guide template having guide holes, the guide template being placed on the first side portion of the belt fastener and with the guide holes aligned with the openings in the belt fastener. The guide template is, when compared with a guide block, relatively thin and is formed of a generally rigid material. The driving tool is provided with an assembly barrel that is placed within or against the guide holes to assume a particular orientation therewith and, thus, provides the alignment function of the guide block, as described above. However, this guide template is best used with a tool having the assembly barrel or another alignment structure cooperating with the guide template to position the rivet for driving in the desired alignment. Conversely, this guide template is not as effective with manual tools that lack the described assembly barrel or another alignment structure. That is, a single driver is not effective utilized with the guide template as it may easily be misaligned.

There are many different typical installation scenarios for conveyor belts of the type described herein. The belts may be installed in an industrial or manufacturing plant. Power plants, such as coal-burning power plants, use conveyor belt systems to move coal from train hoppers to a coal pile, from the coal pile to grinding machines, and from the grinding machines to the ovens for burning the coal. The mining industry, in particular, makes extensive use of these heavy-duty conveyor belt systems, in both above-ground and below-ground installations.

In many installations, particular mining, belt scrapers are installed as part of the belt systems to remove matter that may become stuck to the belt. As the belts move at relatively high speeds, it is easy for the belt scrapers to damage the belts. In fact, a considerable amount of attention is being paid to designing belt scrapers that are able to give or flex when a scraper blade gets caught on a belt.

Together, these different installation scenarios present a number of issues. For belt systems including belt scrapers, breaking of the belt or damage thereto that is extensive enough to require repair is relatively common and expected. During this time, the belt must be out of service, halting the up-stream loading of material and halting the down-stream unloading of materials. For instance, a particular part of a coal mine may be unable to send its ore out of the mine, or a portion of a commercial distribution center may come to a standstill while the belt is being repaired. This places a particular emphasis on the speed in which the belt is repaired.

In some instances, a belt fastener installation may be performed using, a single driver, having a single drive rod. However, field installers generally believe this is a relatively slow and labor-intensive installation.

Multi-rivet drivers have been developed which field installers believe to be faster than the single driver. A known multi-rivet driver includes a head and a plurality of drive rods depending therefrom. The drive rods are inserted within a guide block positioned on top of the belt fastener. Each belt fastener has a pair of openings for each rivet, and the belt fastener has a plurality of such pairs for multiple rivets. For instance, the belt fastener may be secured with five rivets, and the multi-rivet driver has five drive rods used with five pilot holes of the guide block. As five rivets are simultaneously being driven, a larger hammer is used such as a four or five pound hammer. Regardless, multiple strokes are required to drive and swage the multiple rivets.

Commonly, installation or repair with a multi-rivet driver is performed by a pair of repairpersons, one who places the multi-rivet driver in the guide block and a second who swings the hammer. This presents a safety issue as the first repairperson may realize or believe the rivets are fully secured, prompting him or her to reach for the multi-rivet driver. The second repairperson, not having the same belief as to the securement of the rivets, may continue to swing the hammer during which time the first repairperson's hands may be within the path of the hammer. This is known to cause injury to repairpersons, including the loss of fingers.

Early multi-rivet drivers were a unitary piece formed of steel, which resulted in a short-life span due to stress concentrations between a head or cap portion, which formed the anvil struck by the hammer, and the drive rods. In order to promote and extend the life of these tools, other multi-rivet drivers were developed that allow the drive rods to deflect relative to each other, thereby reducing the stress concentrations between the cap and the drive rods. In one form, the prior multi-rivet driver includes a rigid cap or anvil portion, and a deformable round insert or block for holding the drive rods, the block being secured within the cap. In use, however, these drivers produced uneven or unsatisfactory compression of the belt fastener on the belt, and rivets that are not fully driven and seated, each of which thereby concentrates stresses and belt tension forces on the rivets.

In greater detail, the opposed sides of the belt fastener are somewhat open prior to the rivets being driven in comparison to after having the rivets driven. This allows the belt end or splice end to be inserted between the sides of the belt fastener. The belt fastener is then compressed on the belt end as the rivets are driven. When the known multi-rivet driver having deflecting rods is used, the drive rods farthest from the bend of the belt fastener contact and begin to compress the belt fastener before the driver rods closest to the bend do so. As such, this portion of the belt fastener deforms somewhat, thereby reducing the ability of the belt fastener portions to be compressed into a parallel manner, instead being slightly arched. This reduces the load-sharing capabilities of the belt fastener by causing stress concentrations.

One option for overcoming the deficiencies of the manual tools is by using a pneumatic hammer which, by definition, requires a source of compressed air. In underground mining operations, certain difficulties are presented in using pneumatic tools. Subterranean mine air is somewhat different than surface air, containing a higher content of easily compressed gas, and so does not work well with pneumatic tools. Furthermore, because of the content of organic gasses such as methane in mine air, compressing this gas sometimes presents a safety concern. At the minimum, it is, at times, undesirable to run a fossil-fuel engine on a compressor in a mine for a variety of known reasons.

Because of the issues attendant to each of the different tools used for installing belt fasteners on belt splice ends, there has been a need for an improved belt fastening system and for improved tools for performing the operation.

SUMMARY

In accordance with an aspect, a guide assembly for use with a driver for securing a belt fastener and a belt with a rivet is disclosed. The guide assembly may be used with a single-rivet driver, a multi-rivet driver, a pneumatic driver or an electric driver.

The guide assembly includes a guide member having a plurality of pilot holes and being positionable in registry with corresponding rivet holes in the belt fastener, a support for the resiliently deflectable guide layer secured between the guide plate and guide member. The guide layer has a centering portion in registry with the guide member holes, the centering portion generally aligning the rivet with the belt fastener rivet hole for securing the belt fastener and belt.

Preferably, the guide member is a guide block formed of generally rigid material. The pilot holes are preferably generally cylindrical, without a taper. The pilot holes are generally sized to be greater than the size of the rivets. In this manner, the guide block avoids the issues present with known rubber guide blocks, that being chemical attack of the rubber and destruction of the comparatively soft material.

Preferably, the guide support is a plate having holes therein. The holes are aligned with the pilot holes of the guide member and, as such are aligned or in registry with the guide member holes and guide layer centering portion.

Preferably, the guide support, guide layer, and guide member are secured by removable fasteners. As a result, the fasteners may easily be removed to replace a damaged portion of the guide assembly.

The centering portion includes openings centered in registry with the belt fastener rivet holes, with the pilot hole of the guide member, and with the holes of the support plate. The guide layer centering portion may also include a plurality of deflectable flaps defined by intersecting slits. The intersecting slits may include a pair of orthogonal equal-length slits, forming a cross-hair-like opening. The centering portion may further include a circular opening or cut-out centered on the intersection between the slits.

In another aspect, belt splice assembly for facilitating securement of a belt and belt fasteners with a plurality of rivets is disclosed, each belt fastener having a plurality of holes in a predetermined arrangement for receiving the plurality of rivets. The belt splice assembly may include a guide block having a plurality of pilot holes arranged to correspond to each of the belt fastener holes, a swaging portion for securing rivets driven through the belt fastener and belt, guide bores, and guide pins receivable by the guide bores, the guide bores and guide pins configured to align the pilot holes of the guide block with the belt fastener holes.

In one form, the swaging portion includes a plurality of raised portions on a plate, the raised portions aligned with respective belt fastener holes. The raised portions each may include a bore having a central longitudinal axis aligned with a central longitudinal axis of the respective belt fastener holes. The pilot holes are preferably substantially cylindrical, and non-tapered, and the guide block is preferably substantially rigid.

In some forms, the belt splice assembly may include a first assembly including the guide block, and a second assembly including the swaging portion, the first and second assemblies cooperable to align the pilot holes with the belt fastener holes. The second assembly preferably includes a base, and the swage portion is located on a top surface of the base. The second assembly also preferably includes retention structure for receiving and aligning a plurality of the belt fasteners, such as with a series of throughbores and a rod insertable within the throughbores and within the belt fasteners.

In some forms, the first assembly may include a guide layer positioned below the guide block, the guide layer substantially aligning a central longitudinal axis of each rivet with a central longitudinal axis of a respective belt fastener hole. The guide layer includes a plurality of openings aligned with the pilot holes, and each opening has at least a first deflectable portion. Preferably, the guide layer openings have a substantially closed configuration, and the deflectable portion or portions are shiftable to a substantially open configuration during receipt of a rivet therethrough. Preferably, each guide layer opening includes a plurality of slits defining the deflectable portions. The guide layer opening may further include a central cut-out allowing a portion of a rivet to be received therein with the opening in the closed configuration, the cut-out having a center substantially aligned with the longitudinal axis of the belt fastener hole.

In another form, the belt splice assembly includes a first assembly including the guide block and guide pins, and a second assembly including the swaging portion and guide bores, the first and second assemblies cooperable to align the pilot holes with the belt fastener holes. The second assembly may include a base having at least a first base block located on a top surface thereof, and the guide bores may be formed in the base blocks.

In a further aspect, a multi-driving driving tool for securing rivets with a belt and a belt fastener is disclosed. The driving tool includes a head, a plurality of drive rods having at least a lower portion depending from the head and having a predetermined arrangement corresponding to a predetermined arrangement of rivet holes in the belt fastener, and a handle extending laterally from the head for manipulating the driving tool. In use, an operator's hands need to be placed in the potential path of a hammer, thus reducing the likelihood of an accident from a pair of repairpersons using the multi-rivet driving tool.

Preferably, the driving tool head includes an outer cap having an anvil portion or surface on a top surface of the cap for being struck for driving the rivets, and having an inner cavity for receiving an inner mounting portion. The inner mounting portion may have throughbores for receiving an upper portion of each drive rod therethrough. Each drive rod may have a top portion with an enlarged head so that the drive rod head is held in an interference position with the mounting portion. Preferably, the cap and mounting portion are generally rigid, and the mounting portion is press-fit within the cap inner cavity. This eliminates the deflecting of prior art multi-rivet drivers, thereby resulting in improved compression of the belt fasteners and securing of the rivets.

In still a further aspect, a driving tool for securing a rivet with a belt and a belt fastener, the driving tool operable with an electric hammer having a chuck for receiving the driving tool therein, is disclosed. Heretofore, electric hammers had not been used for securing rivets. The driving tool used with the electric hammer is a bit having a chuck end receivable in the electric hammer chuck, an elongated shaft extending from the chuck end, and a tip having a terminal surface for contacting and driving a rivet. The bit tip preferably includes a beveled edge. The bit tip terminal surface is preferably substantially flat. The bit tip terminal surface is preferably generally non-cutting. The elongated shaft is generally cylindrical so that little to no damage is caused to any guide member or block used in conjunction with the electric hammer and bit.

DETAILED DESCRIPTION

Figure 1:
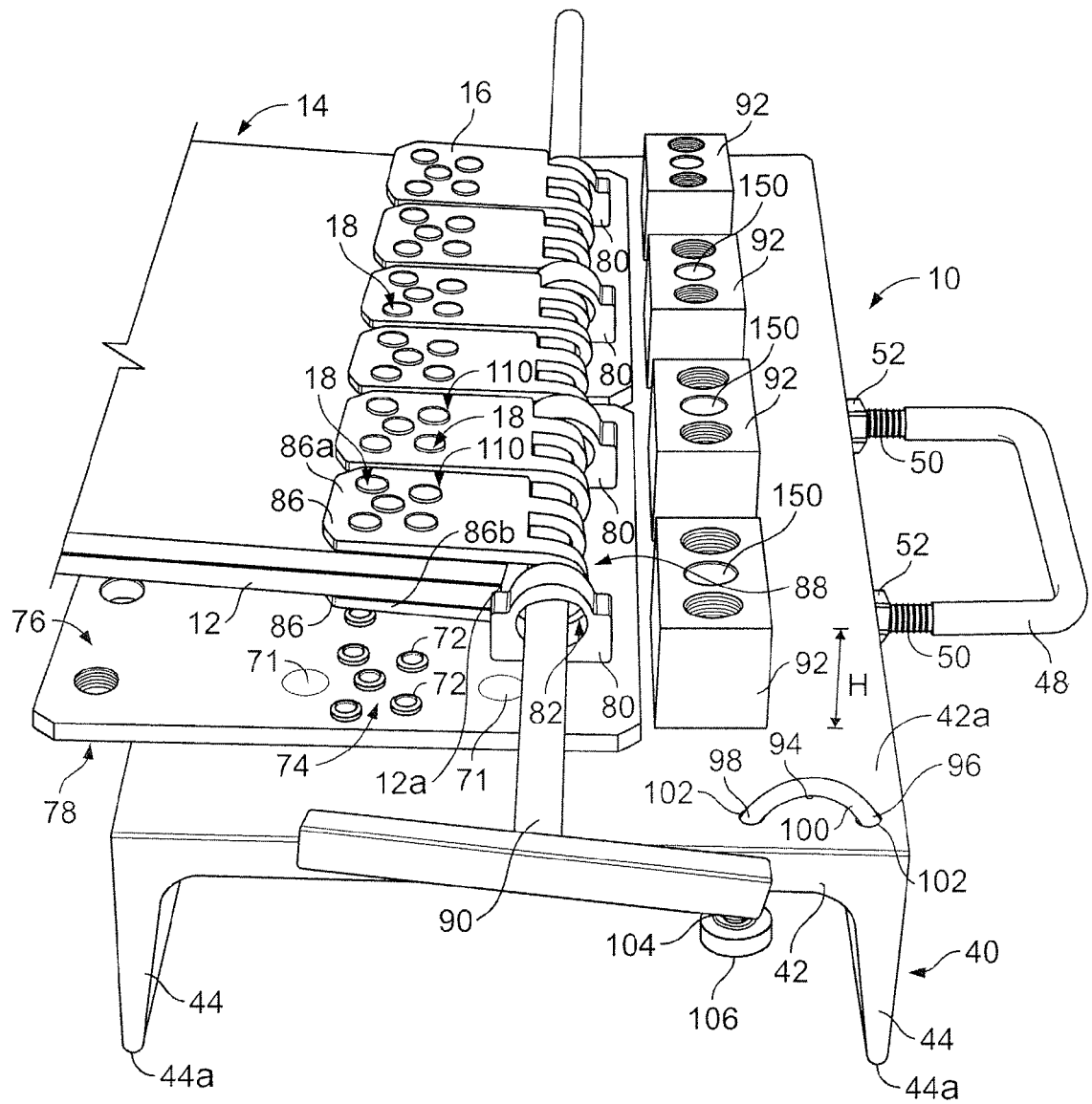
FIG. 1 is a perspective view of a belt end, five belt fasteners, and a mounting assembly for positioning the belt end and belt fasteners for securement on the belt end showing the belt fasteners secured with the belt end by rivets.

Referring initially to FIG. 1, a mounting assembly 10 of the present invention is shown with a belt end 12 of a conveyor belt 14 positioned within and secured with a plurality of belt fasteners 16. In use, the mounting assembly 10 generally retains and positions each of the belt fasteners 16 in a predetermined alignment relative thereto. The belt end 12 is then inserted within the belt fasteners 16, at which point rivets 18 are driven through the belt end 12 and the belt fasteners 16 for securing the belt end 12, belt fasteners 16, and rivets 18. The belt end 12 and the belt fasteners 16 are then secured, hinge-like, with a second belt end 12 to form a belt splice or connection.

Figure 4:
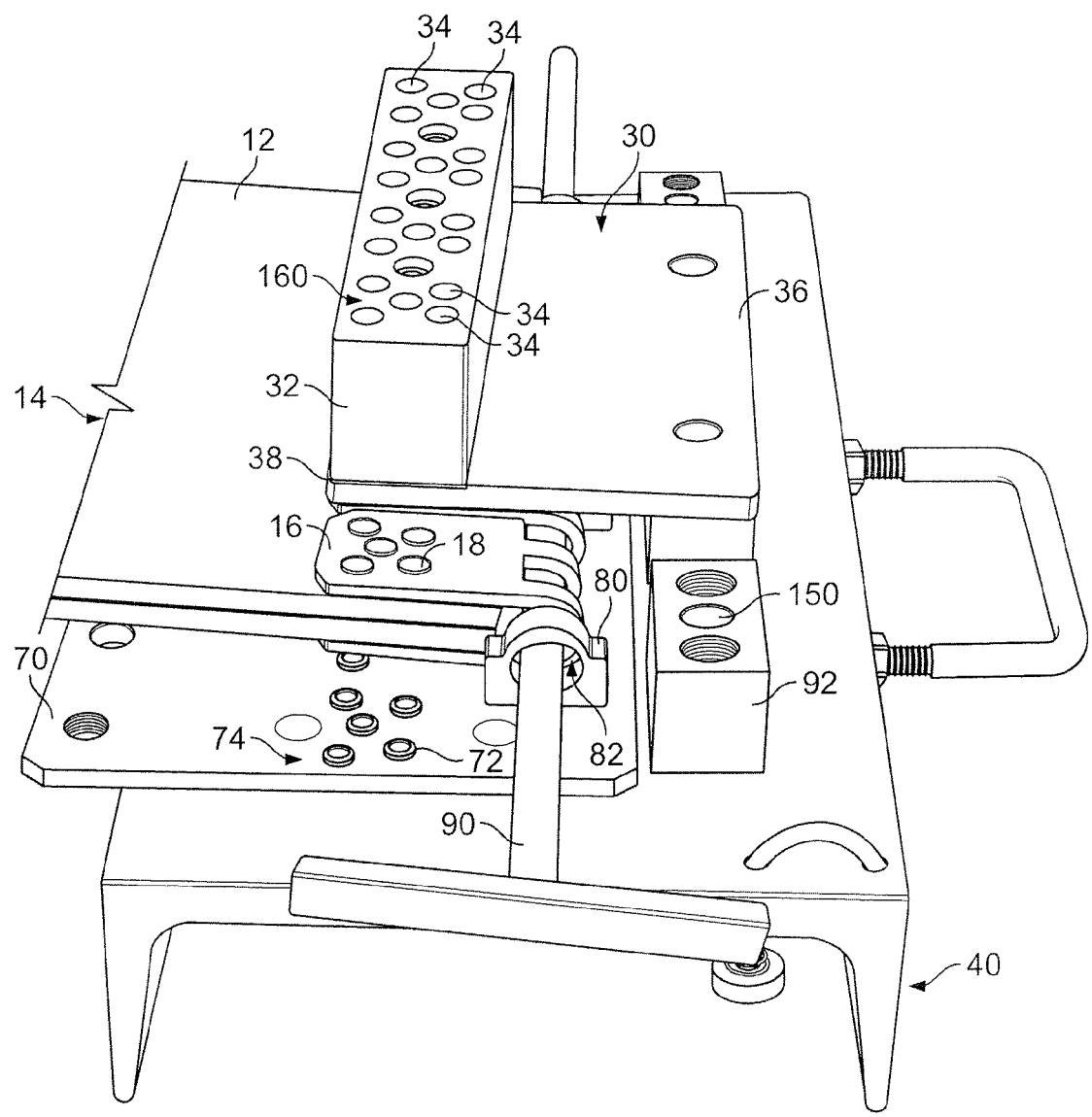
FIG. 4 is a perspective view similar to FIG. 1 showing the mounting assembly with a guide assembly positioned atop the belt end and belt fasteners for aligning rivets in a proper orientation during driving, the guide assembly having pilot holes in a predetermined arrangement for securing the belt fasteners with the belt end.

With reference to FIG. 4, a guide assembly 30 is utilized with the mounting assembly 10 for proper alignment of the rivets 18 during their driving into and through the belt end 12 and belt fasteners 16. The guide assembly 30 includes a guide block 32 secured with and supported by a guide plate 36, through both of which pilot holes 34 are formed for directing the rivet 18 generally in a desired and proper orientation for securing the belt end 12 and belt fastener 16. Between the guide block 32 and guide plate 36 is a guide interposer or membrane 38 for centering each rivet 18 during driving. The pilot holes 34 are sized to receive a variety of driving tools therethrough for driving the rivets 18. Each of these will be discussed in further detail below.

Figure 2:
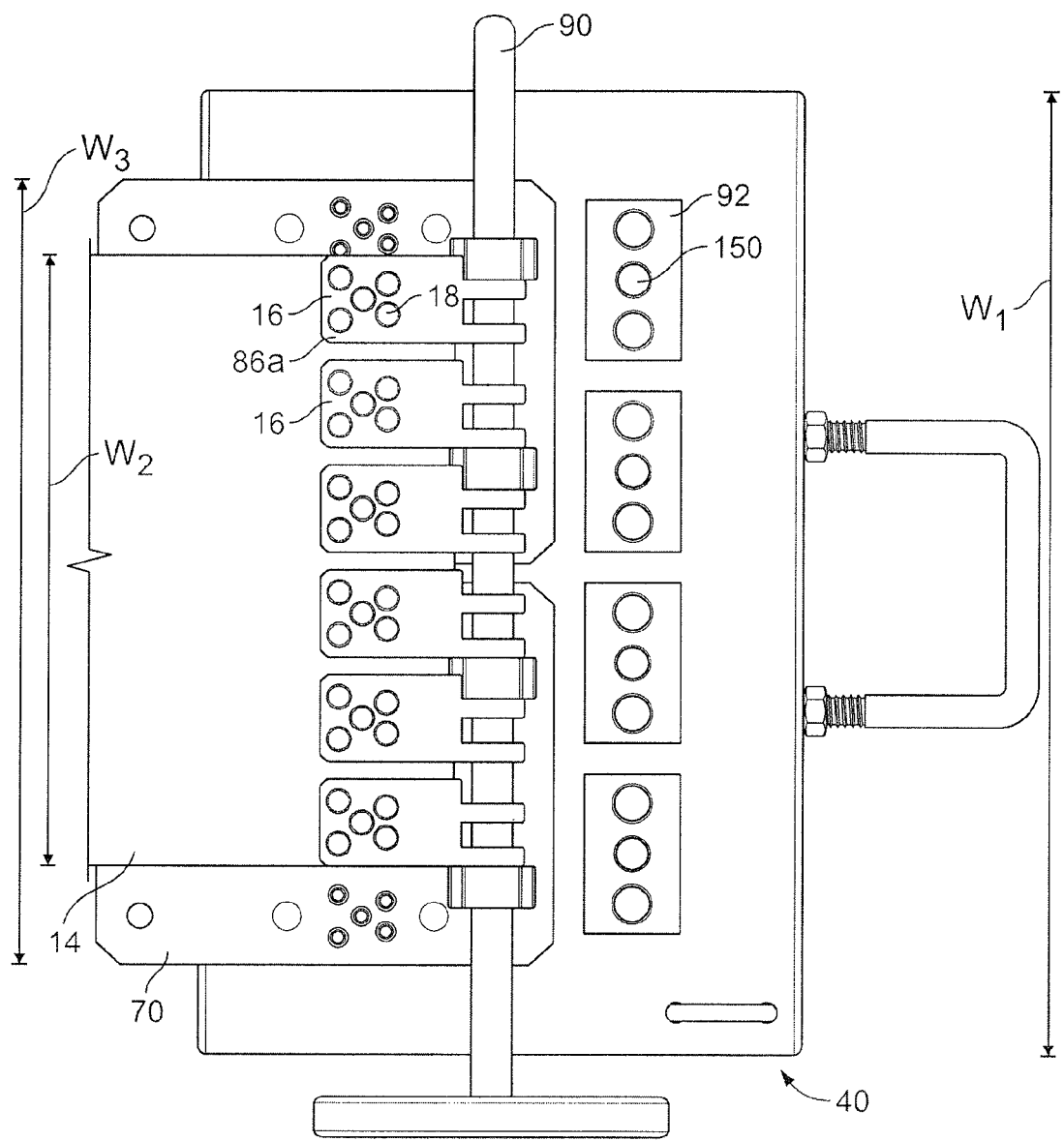
FIG. 2 is a top plan view of the mounting assembly, belt end, and belt fasteners of FIG. 1 from a direction of rivet insertion or driving, showing a guide rod for positioning and aligning the belt fasteners, the guide rod received within the belt fasteners and within guide eyes of the mounting assembly.
Figure 3:
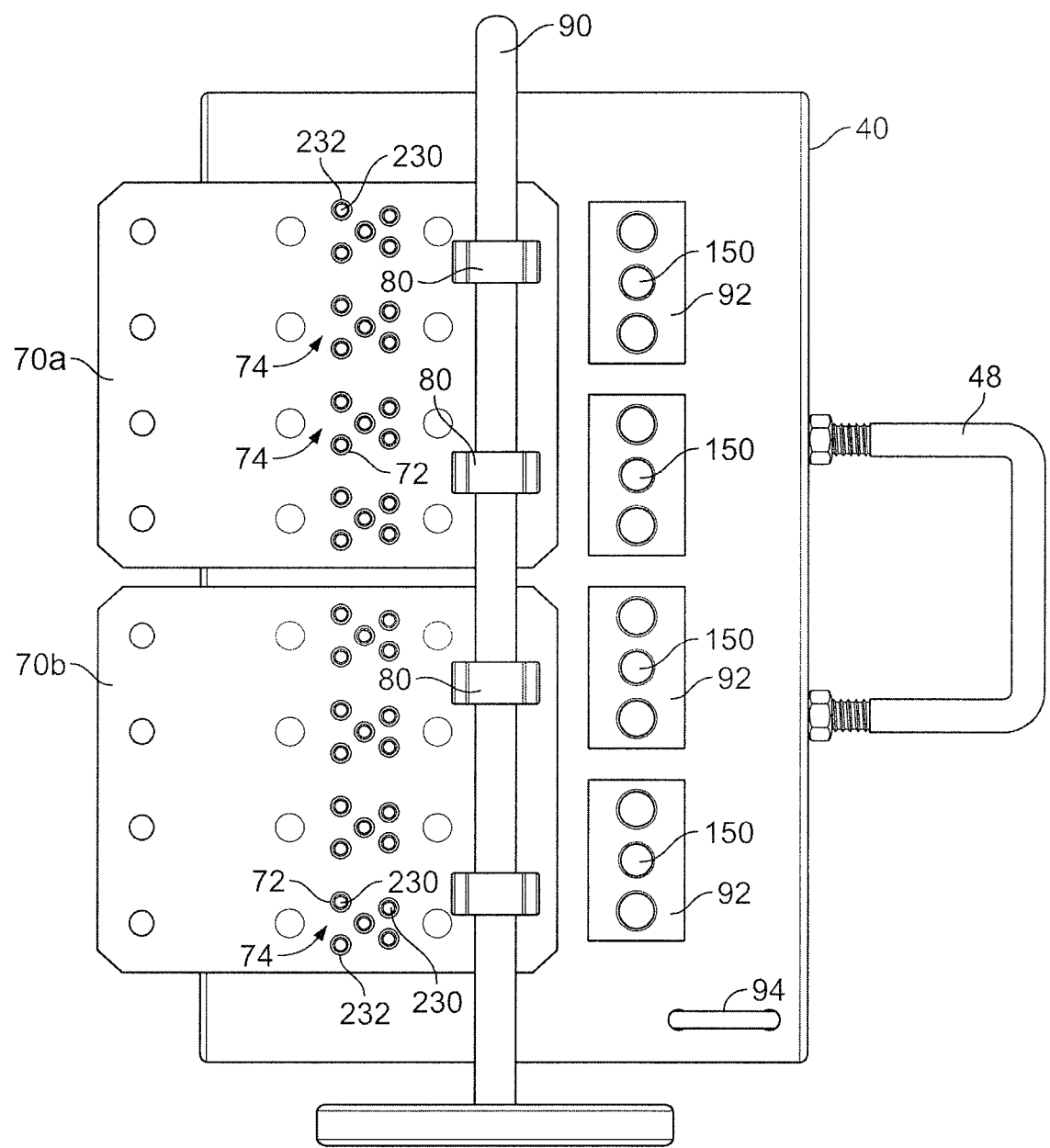
FIG. 3 is a top plan view similar to FIG. 2 with the belt end and belt fasteners removed to show the mounting assembly having a swage plate positioned on top, the swage plate being below the belt fasteners and belt during securement for swaging the rivets.

Referring generally to FIGS. 1-2 and specifically to FIG. 3, the mounting assembly 10 is used to support a belt 12 during a splicing or repair operation, which is essentially a belt fastener installation. That is, in order to repair a belt or splice two ends 12 of the belt 14 when the belt 14 fails or is damaged in service, the mounting assembly 10 is transported to the belt 14 at the repair site for providing a splice between the two belt ends 12. It should be noted that the belt 14 need not actually sever in order for a splice to be performed. For instance, the belt 14 may simply be damaged in a manner that makes operating the belt 14 in its current condition inefficient, dangerous, or likely to fail in a short period of time. In some instances, repairpersons may manually and intentionally sever the belt in order to provide belt ends 12 that are suitable for splicing, suitability including a leading edge 12a which is generally orthogonal to the direction of belt travel such that belt fasteners 16 may be oriented and secured orthogonal to the direction of belt travel. Beneficially, the closer the belt fasteners 16 are this to orientation, the more the belt fasteners 16 are able to distribute forces across their extent.

To facilitate transport to a repair site, the mounting assembly 10 is preferably generally lightweight and compact. As an example, the mounting assembly 10 may have a width W1 which is not extensively greater than a width W2 of the belt 14. As shown in FIG. 2, the width W2 of the belt 14 is smaller than the width W3 of a swage plate 70, discussed below. Accordingly, the presently depicted mounting assembly 10 may be used for repair belts having a larger width than the width W2 of the presently shown belt 14.

In specific, the mounting assembly 10 includes a base 40 having the provided width W1. The base 40 has a top wall 42 having a generally flat top surface 42a. Extending downward from the top wall 42 are laterally extending support walls 44 such that the base 40 generally forms a channel 46. The support walls 44 are generally tapered and the application of force to the top of the mounting assembly 10 allows a lower edge 44a of each support wall 44 to dig into an earthen support surface, such as the floor of a mine, which assists in stabilizing the mounting assembly during use, particularly when the support surface is not completely level. In a preferred form, the base 40 is generally a lightweight and strong material that is relatively chemically resistant for use in environments such as mines where active chemicals are present, such a material being aluminum. It is also preferred to provide the mounting assembly 10 with a carrying handle 48. As depicted, the handle 48 is generally a square U-shape with first and second threaded ends 50 secured in holes (not shown) of one of the support walls 44 via nuts 52. In this manner, the carrying handle 48 can be easily mounted or removed.

As noted above, the mounting assembly 10 includes a swage plate 70 for swaging the rivet 18, the cooperation between which will be discussed below. The swage plate 70 is secured with the base 40, via securements such as bolts 71, and is designed for use with a particular type of belt fastener 16. Accordingly, if different types of belt fasteners 16 are to be used, the swage plate 70 may be removed to allow for a different swage plate (not shown) corresponding to another belt fastener type to be used. For instance, the presently depicted belt fasteners 16 each have a predetermined arrangement for five rivets 18, and the swage plate 70 has a set 74 of swage structures 72 corresponding to each of the five rivets 18, and the swage plate 70 has sets 74 of swage structures 72 for each of the belt fasteners 16. As can be seen in FIG. 3, the swage plate 70 includes eight sets 74 of swage structures 72 which may be used for up to eight belt fasteners 16.

The swage plate 70 has top and bottom surfaces 76, 78 which are each generally flat. Secured to the swage plate top surface 76 is a series of guide eyes 80. Each guide eye 80 has a throughbore 82 extending generally in a lateral direction of the belt end 12, and the throughbores 82 are aligned with each other.

To position the belt fasteners 16 with the mounting assembly 10, the belt fasteners 16 are aligned with the throughbores 82 of the guide eyes 80. In greater detail, each belt fastener 16 is generally U-shaped or V-shaped so that each has two side portions 86 and a curved portion or bend portion 88 connecting the side portions 86 to form a channel or trough 88 therethrough. The belt fastener 16 is placed on top of the swage plate top surface 76 with a first side portion 86a facing upward and a second side portion 86b facing downward and against the top surface 76. The trough 88 is aligned with the guide eye throughbores 82. To retain the belt fasteners 16 with the mounting assembly, a guide rod 90 is inserted through each of the aligned guide eye throughbores 82 and through each of the troughs 88 of the belt fasteners 16. Thus, the belt fasteners 16 are generally prevented from separating from the mounting assembly 10 by the guide rod 90, by internal stops (not shown) between the side portions and in an interference position with the guide rod 90, and by base blocks 92, which will be discussed in greater detail below.

For ease of transport, the guide rod 90 is retained with the base 40. As shown, the base 40 includes a pair of retainers 94. Each retainer 94 is generally U-shaped having a first leg 96 and a second leg 98 and a bend 100. Leach leg 96, 98 of the retainer 94 passes through a hole 102 in the top wall 42, and the bend 100 is positioned above the top wall 42. The first leg 96 has a spring 104 positioned therearound, the spring 104 retained by a head 106. When upward force is applied to the retainer 94, the spring 104 is compressed and the bend 100 moves away from the top wall 42, thereby allowing the guide rod 90 to be received between the bend and the top wall 42. Once the upward force is released, the spring 104 draws the retainer 94 downward so that the guide rod 90 is clamped between the bend 100 and the top wall 42.

Once the belt fasteners 16 are retained with the mounting assembly 10 by the guide rod 90, the belt end 12 may be inserted between the side portions 86 of the belt fastener 16. That is, the belt leading end 12a is inserted between the belt fastener side portions 86 and the belt 14 is positioned so that the direction of travel for the belt 14 is generally orthogonal to the direction of the guide rod 90. Each belt fastener 16 has the internal stop (not shown) between the side portions 86 that limits the depth of insertion for the belt leading end 12a.

In this arrangement, the belt fasteners 16 are generally aligned with the swage structures 72. For the presently depicted embodiment, the belt fasteners 16 are designed for receiving five rivets 18 each. Each side portion 86 of the belt fastener 16 has a five rivet holes 110, and each is aligned with a respective rivet hole 110 of the opposed side portion 86. The rivet holes 110 are in a predetermined arrangement, and the swage structures 72 are arrayed in a matching arrangement. Accordingly, the rivet holes 110 of the side portions 86 and the swage structures 72 are aligned so that the rivets 18 may be driven through the belt fastener 16 and belt 14 and then swaged around the lower side portion 86b, either sequentially or simultaneously.

Figure 5:
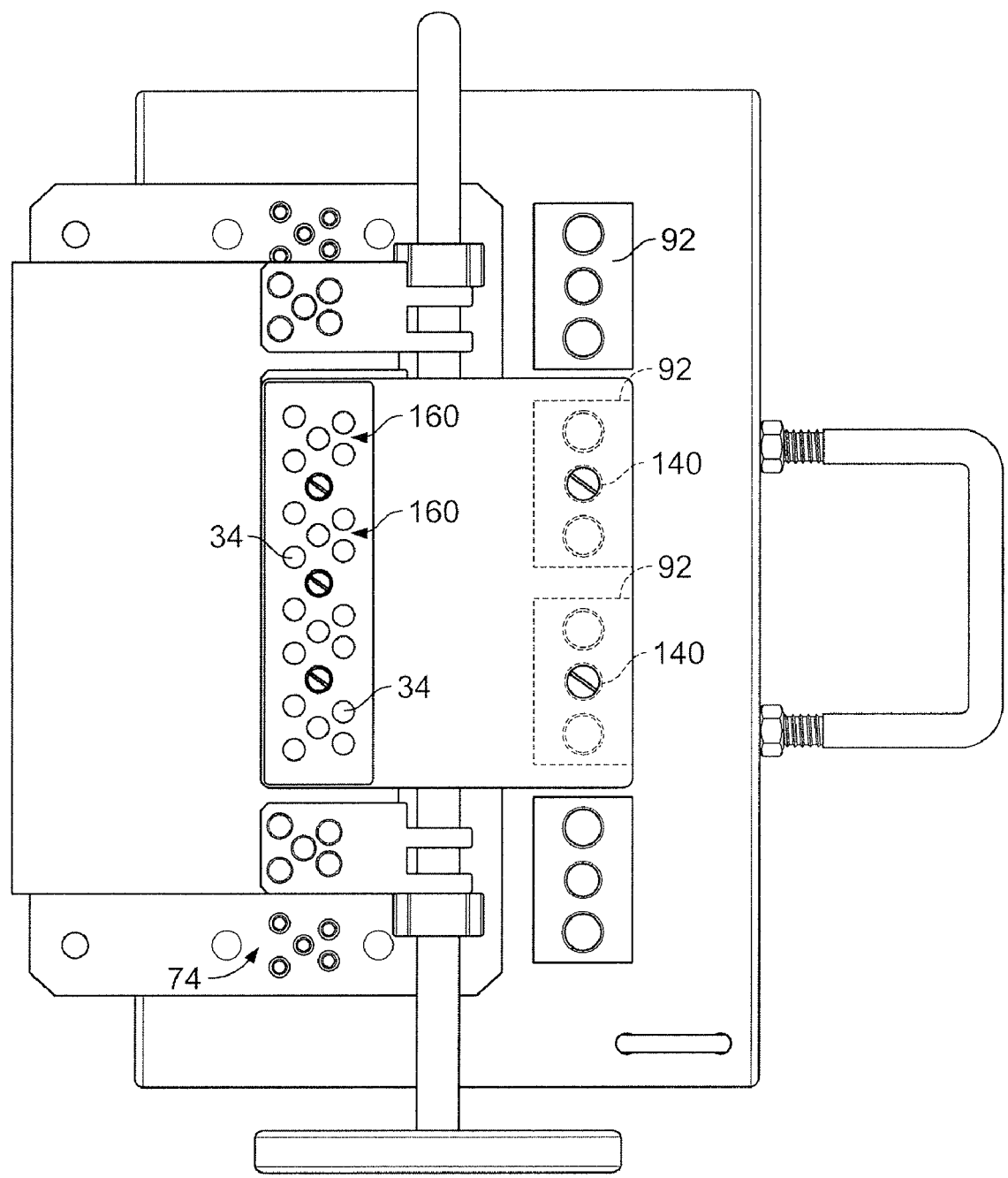
FIG. 5 is a top plan view of the mounting assembly and guide assembly of FIG. 4 showing guide pills of the guide assembly in phantom and received in base blocks of the mounting assembly for aligning the guide assembly in proper orientation with the mounting assembly and belt fasteners during driving of the rivets.
Figure 6:
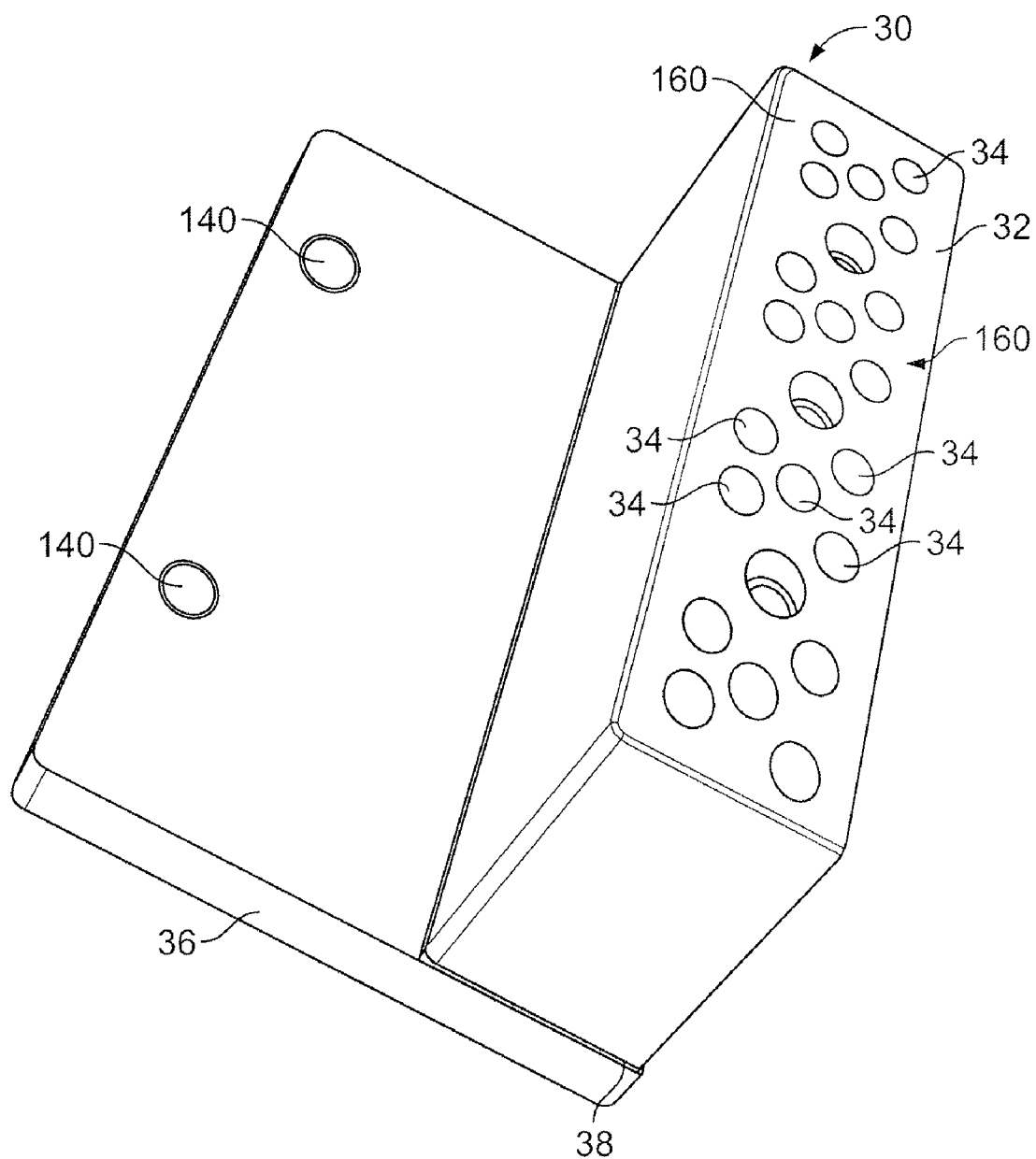
FIG. 6 is a perspective view of the guide assembly of FIG. 4 showing a guide plate supporting a guide block having a pre-determined arrangement of pilot holes for receiving rivets for securing the belt fastener with the belt end.

Referring generally to FIGS. 4 and 5 and, more specifically, to FIGS. 6-9, the mounting assembly 10 cooperates with the previously-mentioned guide assembly 30 to align the rivets 18 with the rivet holes 110. As noted, the guide assembly 30 includes pilot holes 34 formed in the guide block 32 and guide plate 36. The pilot holes 34 are generally cylindrical, as opposed to the tapered pilot holes of prior guide blocks, so that the rivets 18 easily pass therethrough with minimal contact and damage to the guide assembly 30. In prior blocks, tapered pilot holes were used to center the rivets with the rivet holes of the belt fastener during driving. The present guide assembly 30 includes a relatively tall guide block 32 which, despite tolerances between the pilot holes 34 therein and the rivets 18, minimizes the deviation of the rivet 18 during driving. Preferably, the guide block 32 is formed of ultra-high molecular weight polyethylene. This material is rigid and tough and resistant to wear, is self-lubricating, is stable in a mining environment, and has a low sliding coefficient of friction, particularly when used with the metal drivers, as is discussed herein. Ideally, the alignment of the rivet 18 during driving is such that its longitudinal central axis is aligned with an axis through the rivet holes 110 provided for the rivet in the opposed side portions 86 of the belt fastener 16.

Figure 8:
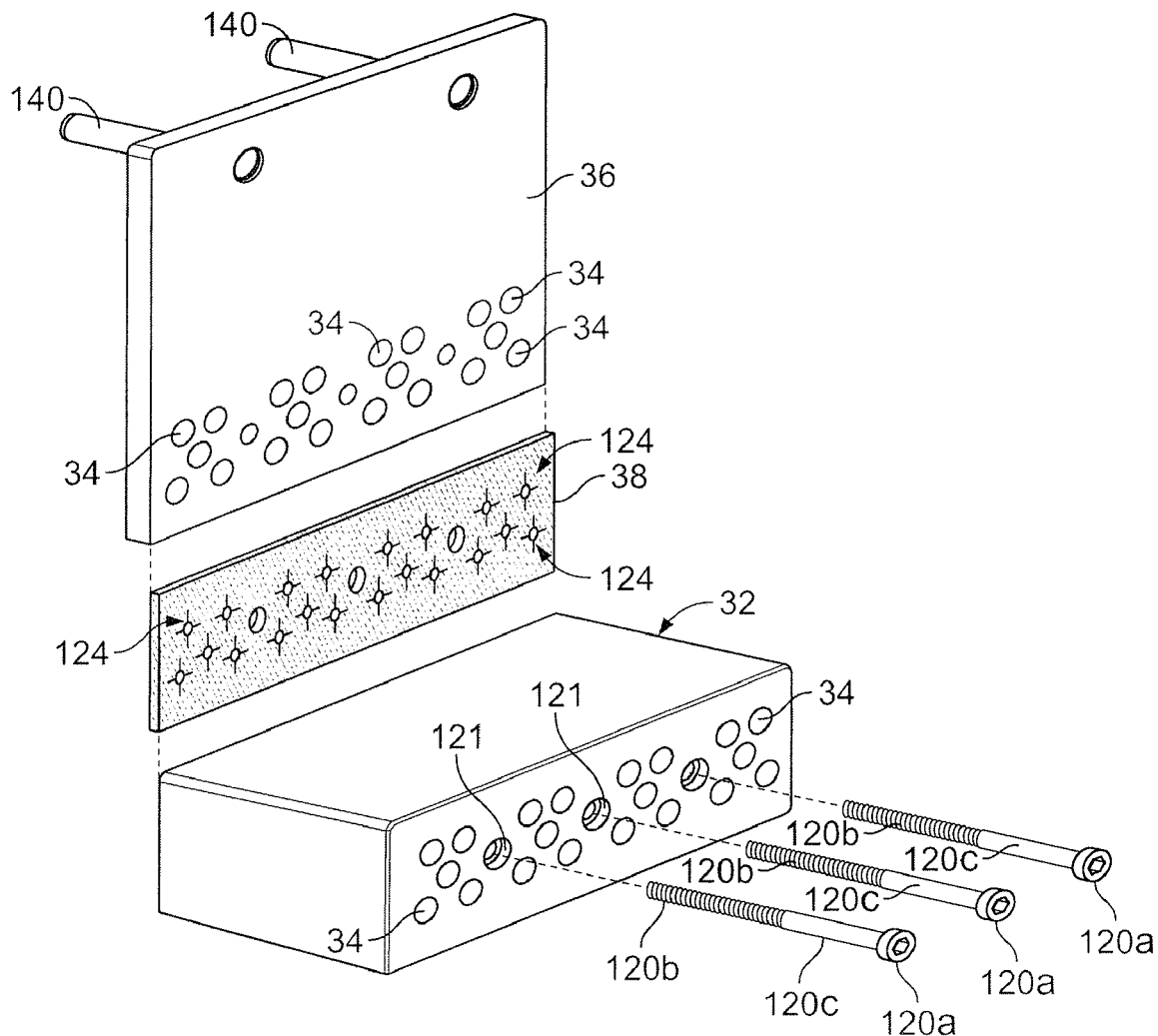
FIG. 8 is an exploded view of the guide assembly of FIGS. 4-7 showing mounting screws for securing the guide plate with the guide block with the guide membrane therebetween.

In order to center and align the axis of the rivet 18 with the axis of its respective rivet holes 110, the guide membrane 38 is provided between the guide block 32 and the guide plate 36. As can be seen, the guide membrane 38 is relative thin, in the order of one-eighth of an inch to one sixteenth of an inch, while the guide block 32 has a height in the order of two and a quarter inches. The guide block 32 and guide plate 36 are secured together, with the guide membrane 38 between, via removable fasteners such as screws 120 (FIG. 8). Preferably, the screws 120 have a socket head 120a, a threaded shank portion 120b, and a non-threaded shank portion 120c. The non-threaded portion 102c is closely fit within its respective hole 121 in the guide block 32 so that the screw 120 serves to help locate the guide block 32 relative to the guide plate 36, as well as to assist in maintaining that location. In this manner, the guide membrane 38 is somewhat compressed between the guide block 32 and guide plate 36.

The guide membrane 38 is formed of a relatively soft rubber material. Preferably, the guide membrane 38 is formed of a chemically-resistant rubber having a 900 psi tensile strength and elongation limit of 300%. An example of a preferred material is sold as "Ultra-Strength Neoprene Rubber" by McMaster-Carr of Elmhurst, Ill. This material provides strength, organic chemical resistance, and flame resistance, with a tensile strength of 2500 psi and stretch elongation limit of 450%.

Figure 9:
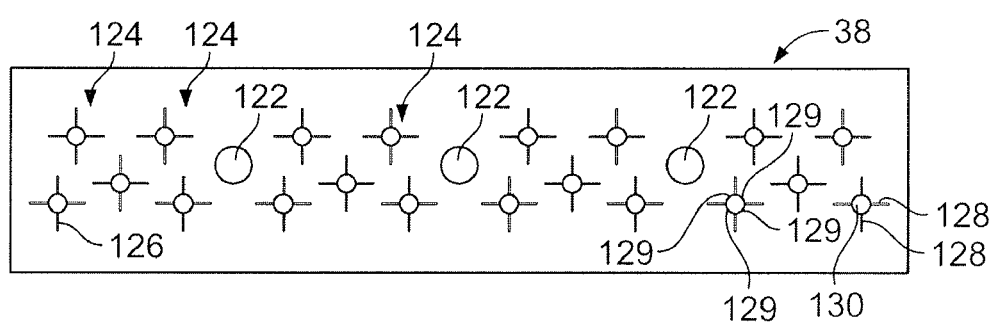
FIG. 9 is a top plan view of the guide membrane showing slit patterns aligned with and positioned between portions of the pilot holes in the guide block and guide plate.

As can be seen best in FIGS. 8 and 9, the guide membrane 38 has a series of holes therethrough. As shown, three holes 122 are provided for the screws 120 to pass through for securing components of the guide assembly 30. The other holes are centering holes 124 provided with a slit pattern 126 for centering the rivets 18 during driving.

In specific, the slit pattern 126 includes a pair of orthogonal, cross-hair equal-length slits 128 extending through the guide membrane 38. Centered on the cross-hair slits 128 is a small circular cut-out 130 where the material has been removed. The cross-hair slits 128 define four flaps 129. Alternatively, slits may be provided for defining three flaps, or greater than four flaps.

Figure 11:
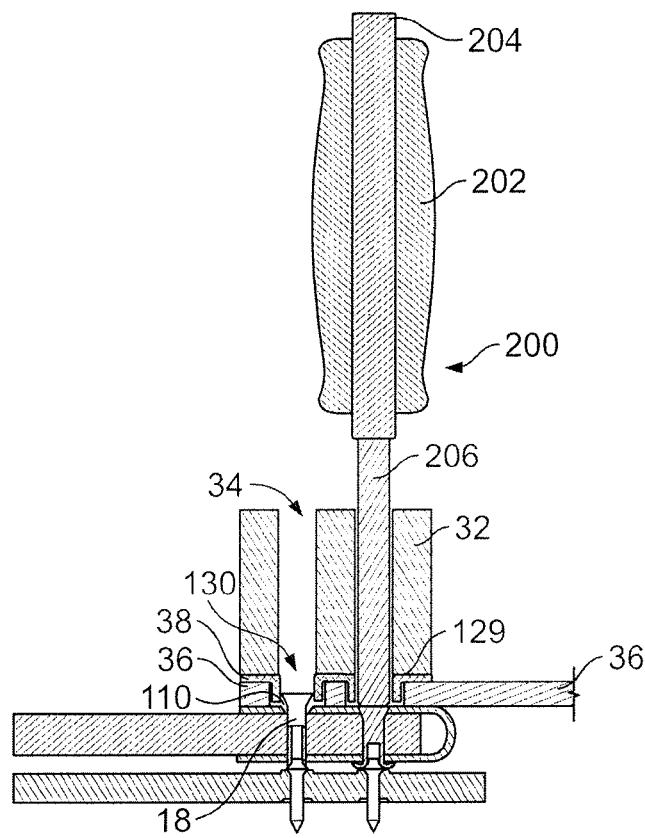
FIG. 11 is a cross-sectional view of a single driver for driving a single rivet through a belt fastener and belt for securement therebetween, a first rivet being positioned in the pilot hole of the guide block and a second rivet having been swaged by the swage plate of the mounting assembly.
Figure 12:
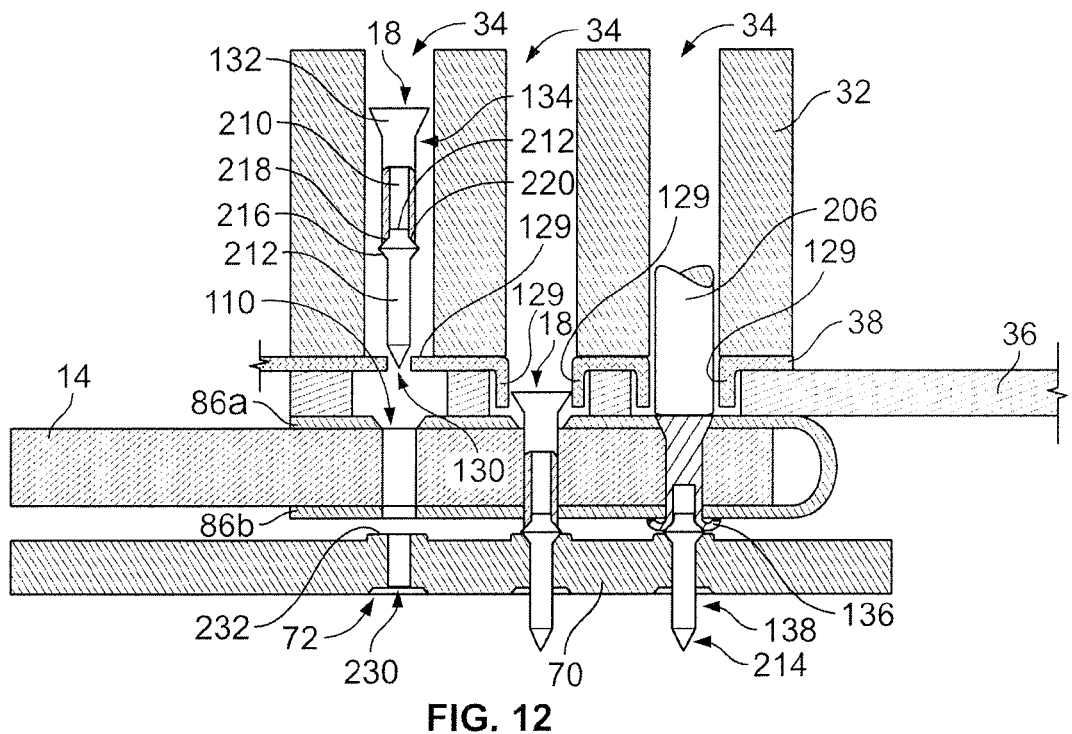
FIG. 12 is a cross-sectional view of a belt fastener being secured with a belt, a swage plate positioned below the belt fastener and a guide assembly positioned thereabove, a rivet being shown in three different positions during the driving process.

As is known, a standard belt fastener rivet 18 has a head 132, a shank 134 at least a leading portion of which is hollow or annular, an annular leading end 136 for the shank 134, and a pilot nail 138 (see FIGS. 11 and 12). The rivet 18 passes through the pilot hole 34 portion of the guide block 32 and the pilot nail 138 is centered by the cut-out 130. As the rivet 18 continues downward, the rivet 18 forces the flaps 129 downward (into the pilot hole 34 portion formed in the guide plate 36) to allow the rivet 18 to pass through. The forces on the rivet 18 applied by the resiliently deflected flaps 129 is balanced to retain the rivet 18 in a generally centered position.

The rivet 18 then passes through the pilot hole 34 portion of the guide plate 36, at which point the rivet 18 is then driven through the belt fastener rivet holes 110 and the belt 14. As is also known, the pilot nail 138 is frangible or releasable. In this manner, the leading end 136 of the shank 134 is deformed or swaged around the lower belt fastener side portion 86, and the pilot nail 138 is separated the rivet 18 during or after the swaging. As noted, the guide membrane 34 is compressed between the guide block 32 and guide plate 36 so that stretching and/or deformation of the guide membrane 34 is localized at the flaps 129. Once the rivet 18 is driven, the driving tool (discussed below) is removed and the flaps 129 return to their natural position. In this configuration, the life-expectancy of the guide assembly 30 is significantly increased in comparison to the prior guide blocks, and there is no need for lubricants.

Figure 7:
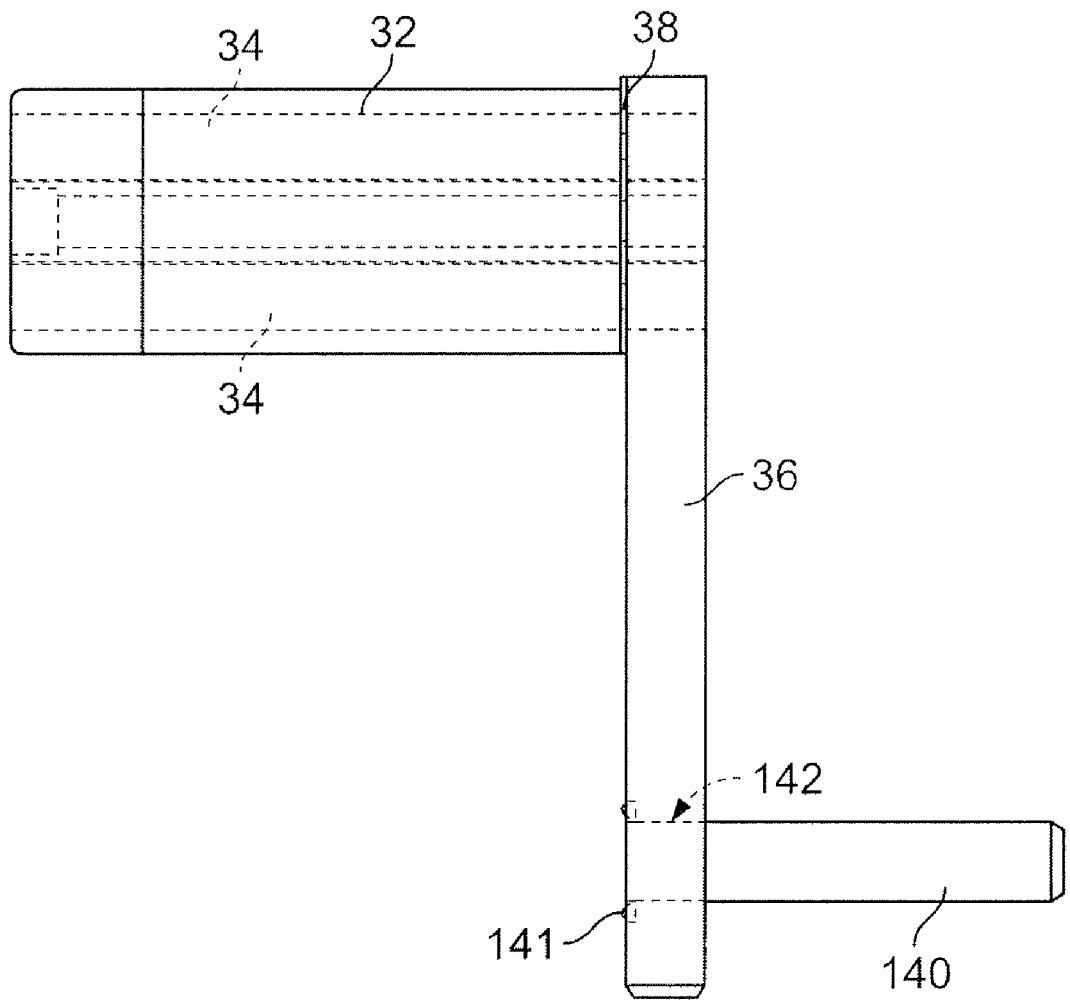
FIG. 7 is a side elevation view of the guide assembly of FIG. 6 showing the guide pills extending from the guide plate, a centering guide membrane interposed between the guide block and the guide plate, and the pilot holes in phantom.

Prior to driving of the rivets 18, the guide assembly 30 is aligned with the mounting assembly 10. For this, the guide plate 36 of the guide assembly 30 includes guide pins 140 extending orthogonally from a bottom side of the guide plate 36, as best seen in FIG. 7. Preferably, the guide plate 36 includes throughbores 142 extending through the guide plate 36, and the guide pins 140 are secured within the throughbores 142. Each guide pin 140 may be secured via press-fitting, and may have an enlarged head portion 141 assisting in maintaining the proper alignment of the guide pin 140 relative to the guide plate 36. Preferably, the guide pins 140 are welded within the guide plate 36 after they are press-fit therein. This construction minimizes stress concentrations that may arise from securing the guide pins 140 to the bottom side of the guide block 36, as well as minimizes the likelihood of accidental bumps or strikes to bend the guide pins 140.

To position the guide assembly 30 with the mounting assembly 10, the guide pills 40 are registered with and received within the guide blocks 92, noted above. In the present embodiment, the guide pins 140 are circular or cylindrical such that at least a pair is used for proper registry. However, a single guide pin may be used with an irregular or non-circular shape so that proper registry is defined by the receipt of the non-circular guide pin with a corresponding port formed in the mounting assembly 10. Further, the present embodiment utilizes the guide blocks 92 having a height H. The height H is partly provided in respect for the expected thickness of the belt 14 and belt fasteners 16. More importantly, the height H provides a depth of receipt by guide bores 150 formed in the guide blocks 92 for receiving the guide pins 140. While a tolerance is provided between the outer diameter of the guide pins 140 and the inner diameter of the guide bores 150, the ability of the guide pins 140, and hence the guide assembly 30 itself, to deviate from proper alignment is minimized by the dept of the insertion of the guide pins 140 within the guide bores 150. Accordingly, the guide blocks 92 are sized to maximize the receipt of the guide pins 140 therewithin, while also being sized to allow the guide assembly 30 to be positioned proximate the top belt fastener side portion 86a as the rivets 18 are driven and the belt fastener side portions 86 are compressed. This minimizes the ability of the rivets 18 to deviate from the desired direction of driving after the pilot nail 74 passes through the guide plate 36. In one form, a bottom side of the guide plate 36 may rest on a top surface of guide blocks 92 during use.

Figure 10:
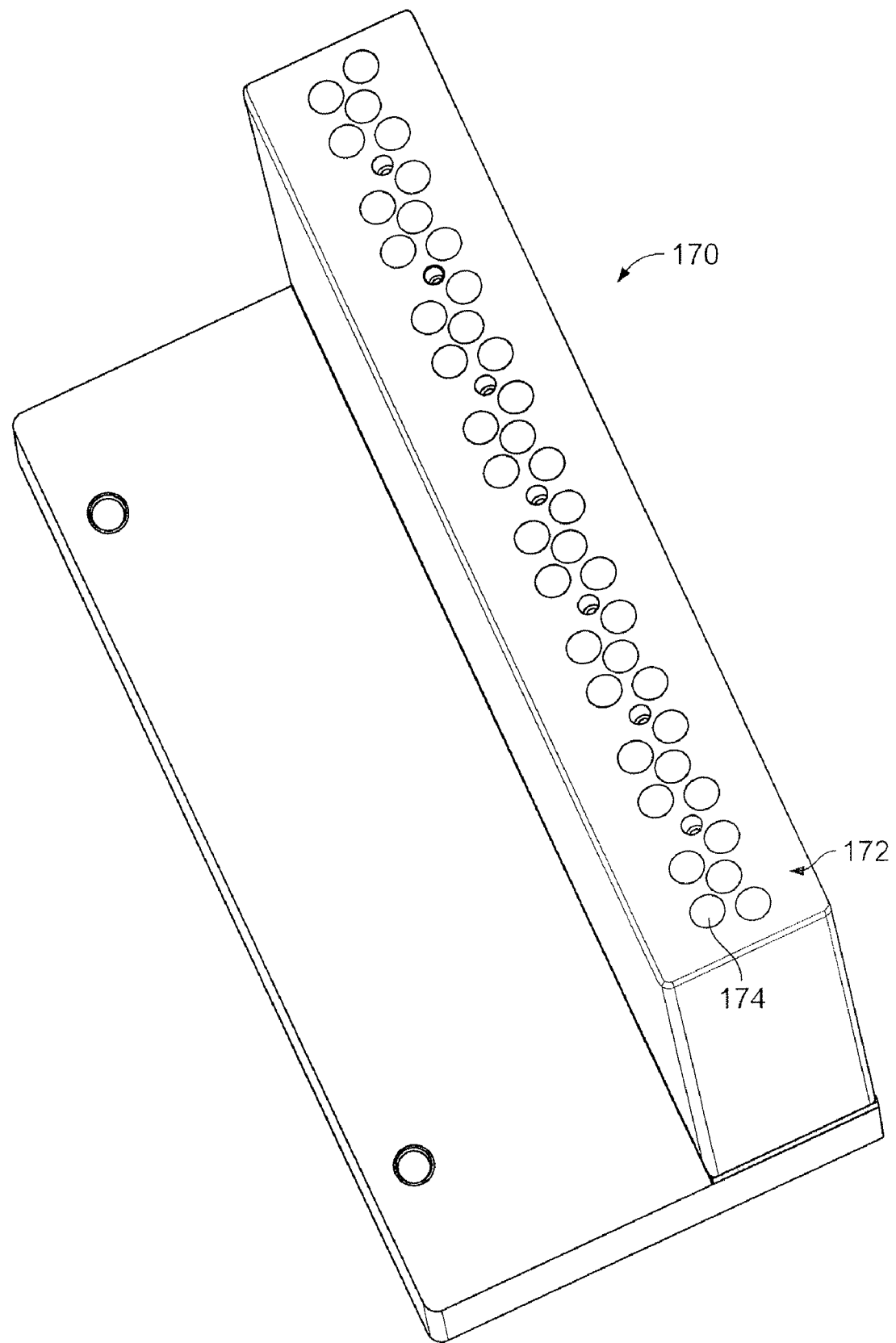
FIG. 10 is a perspective view of a second form of a guide assembly having pilot holes in a pre-determined pattern for securing eight belt fasteners with a belt end.

The guide assembly 30, as discussed, provides pilot holes 34 for a particular number of belt fasteners 16. For instance, FIG. 5 shows the guide block 32 having four sets 1660 of pilot holes 34. The swage plate 70, however, has eight sets 74 of swage structures 72, one set for each belt fastener 16. It is noted that, as shown, the swage plate 70 includes first and second swage plate portions 70a and 70b. The number of pilot hole sets 160 and swage structure sets 74 may be varied as desired or for particular applications, as well as the configuration of each set 160, 74 for various belt fastener configurations. However, each of these may use standard pilot-nail rivets provided by a number of known manufacturers. In an alternative embodiment, shown in FIG. 10, a guide assembly 170 is provided having eight sets 172 of pilot holes 174. For wide belts, the four-set guide assembly 30 may be used in a first position for securing a first group of belt fasteners 16, and it may be repositioned for securing a second group of belt fasteners 16. Alternatively, the eight-set guide assembly 170 may be used for securing up to eight belt fasteners 16 without repositioning. In common industry usage, it is known that belts 14 may be 96 inches wide, or greater. Accordingly, the guide assemblies 30 and 170 and the mounting assembly may be adapted for a range of belt widths, as desired.

As various guide assemblies, such as the guide assemblies 30 and 170, or others, may be used with the mounting assembly 10, the mounting assembly 10 provides a plurality of the guide blocks 92 such that guide pins 140 on each of the guide assemblies 30, 170 may be registered and received therewith. As shown in the present embodiment, the mounting assembly 30 includes four guide blocks 92, the guide bores 150 formed therein being positioned for proper registry of the guide pins 140 and guide assemblies 30 with the rivet holes 110 of the belt fasteners 16.

As discussed, the rivet 18 has the rivet head 132, the shank 134, and the pilot nail 138. The shank 134 is at least partially, and possibly fully, annular so that a cylindrical cavity 210 is formed therewithin. The pilot nail 138 has a nail shank 212 with a conical or otherwise pointed lower tip 214 and an outwardly flaring or conical portion 216 above the tip 214, the conical portion 216 forming an upper shoulder 218 with the nail shank 212. The nail shank 212 is received within the cavity 210 with the upper shoulder 218 abutting the rivet shank 134. More specifically, the rivet shank leading end 136 forms a rivet shoulder 220 positioned against or close to the shank upper shoulder 218.

The operation of the swage plate 70 in cooperation with the rivet 18 is described in U.S. Pat. No. 5,680,790, to Richardson, et al., the entirety of which is fully incorporated herein by reference. In simple terms, the each swage plate swage structure 72 is formed by a hole 230 in the swage plate 70 and surrounded by a raised, annular swaging shoulder 232. As the rivet 18 is driven through the belt 14 and belt fastener 16, the pilot nail 138 extends through the belt fastener lower side portion 86b and enters the hole 230. With continued driving, the nail shank conical portion 216 contacts the swaging shoulder 232 and compresses, whereupon the rivet shank leading end 136 contacts the swaging shoulder 232. The rivet shank 134 flares outward as it is driven against the swaging shoulder 232, thus wrapping around to secure the rivet 18 against the bottom belt fastener side portion 86b.

For performing a splice operation for joining two ends 12 of the belt 14, one or more repairmen transport the lightweight mounting assembly 10 and guide assembly 30 to a work site, such as in a mine. The guide pins 140 of the guide assembly 30 may be received by the guide bores 150 of the mounting assembly guide blocks 92 so that the mounting assembly 10 and guide assembly 30 may be transported as a single unit. The mounting assembly 10 is positioned on the support surface in a desired location for performing the operation. The guide rod 90 is removed from the retainers 94. A plurality of selected belt fasteners 16 are positioned on the swage plate 70, and the guide rod 90 is inserted through the belt fasteners 16 and through the guide eye throughbores 82.

The belt end 12 is then inserted into the belt fastener side portions 86. The guide assembly 30 is then positioned above the mounting assembly 10 so that the guide pins 140 can be inserted into the guide bores 150. The guide assembly 30 is then lowered. Thus proper alignment is provided for the pilot holes 34 of the guide block 32 and guide plate 36, the cut-out 130, the belt fastener rivet holes 110, and the swage structures 72. For driving each rivet 18, the rivet 18 is placed in the pilot hole 34 of the guide block 32 with the pilot nail tip 214 self-centering in the cut-out 130 of the guide membrane 38. Next, the user selects a driver for securing the rivets 18 in the manner described above.

Figure 13:
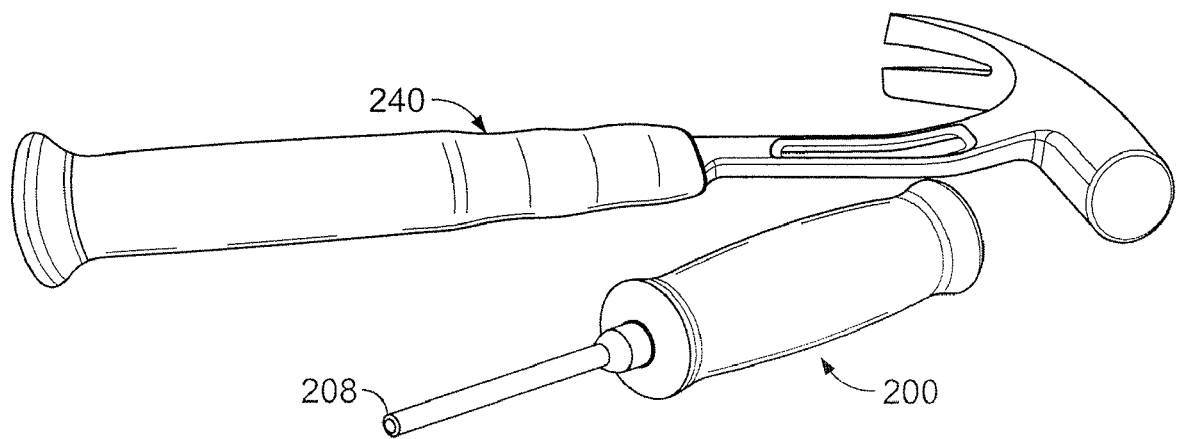
FIG. 13 is perspective view of a hammer and the single driver of FIG. 11 for securing a single rivet.

The guide assembly 30 and mounting assembly 10 may be used with a variety of driving tools. More specifically, the pilot holes 34 are sized and arranged for use with driving tools depicted in FIGS. 11-19. With initial reference to FIGS. 11-13, a representative driver is shown for driving a standard belt fastener rivet 18. As shown, the driver is a single-rivet driver 200 having a handle 202 for gripping and handling the driver 200 and a central shaft 204 secured with the handle 202. A lower portion of the central shaft 204 is a cylindrical drive rod 206 having a chamfered peripheral edge 208. The single-rivet driver 200 is generally used with a framing weight hammer, such as a 16-ounce hammer 240, shown in FIG. 13. With the rivet 18 positioned within the pilot hole 34, the drive rod 200 is inserted into the pilot hole 34 and pushes down on the rivet 18 so that the rivet nail tip 214 deflects the membrane flaps 129 downward and outward. The flaps 129 maintain contact with the rivet 18 so the rivet 18 remains centered. The hammer 240 is then used to strike the driver 200 to drive and secure the rivet 18.

Figure 14:
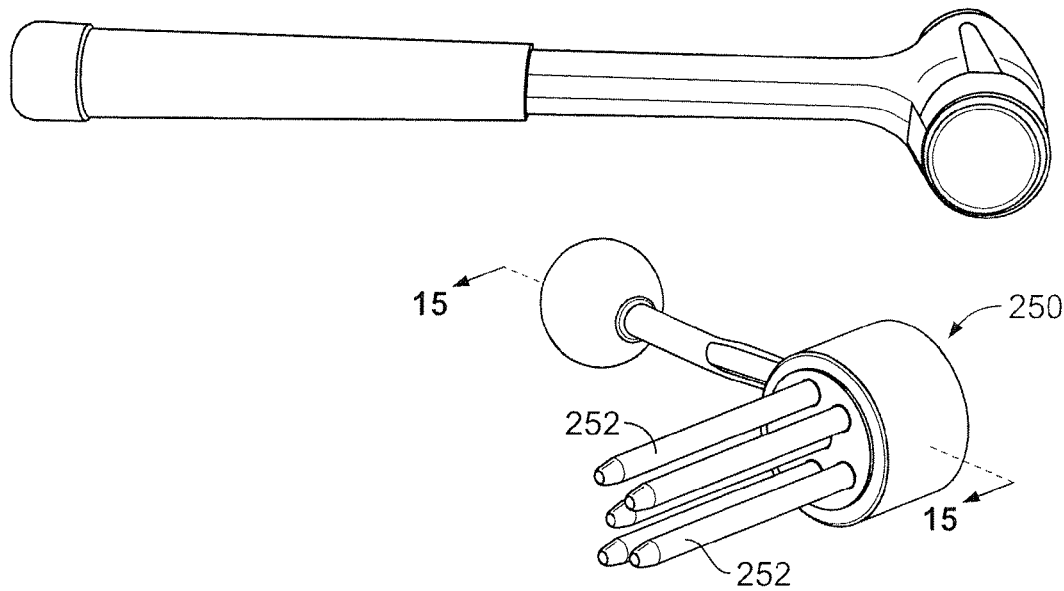
FIG. 14 is a perspective view of a second hammer and a multi-driver for simultaneously driving a plurality of rivets in a predetermined arrangement.
Figure 15:
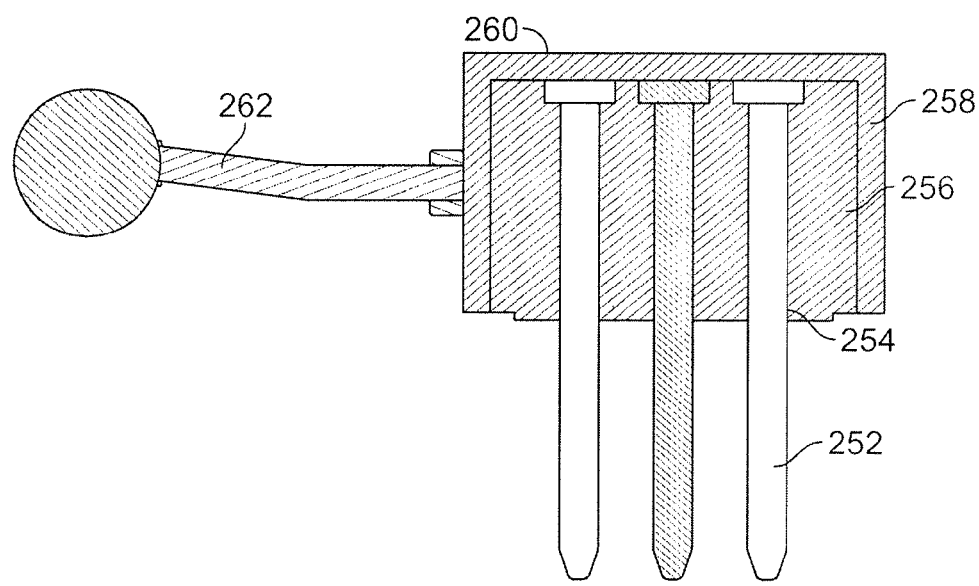
FIG. 15 is a cross-sectional view of the multi-driver of FIG. 14 showing a plurality of drive rods secured within an anvil cap.

As discussed, the guide block 32 includes a plurality of pilot holes 34 arranged to be in registry with the rivet holes 110 of the belt fasteners 16. Accordingly, a multi-rivet driver 250 may be used with the guide block 32 and guide assembly 30. With reference to FIGS. 14 and 15, the multi-rivet driver 250 is shown having five drive rods 252 receivable by the guide block pilot holes 34. Each drive rod 252 is slip fit within bores 254 of a solid and incompressible, preferably metal, insert 256. The insert 256 is then press-fit within an anvil cap 258. In this manner, the drive rods 252 are generally restrained from deflecting during the driving of the rivet 18. The anvil cap 258 has a top surface 260 or being struck to drive the rivets 18. As discussed above, the use of prior multi-rivet drivers has occasionally presented a safety issue. Accordingly, a safety handle 262 extends from a side of the anvil cap 258 for insertion into and removal from the guide block 32.

Figure 16:
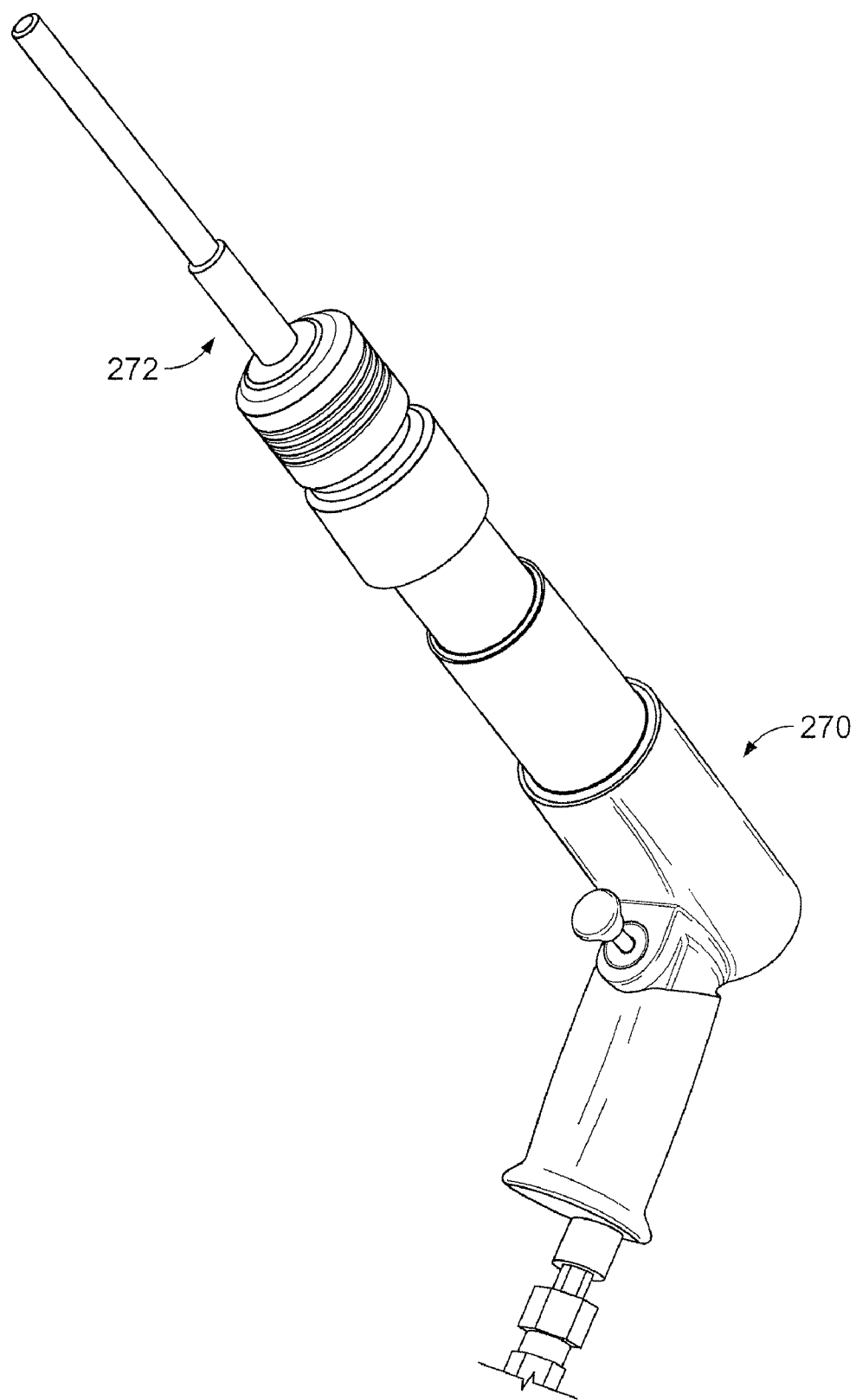
FIG. 16 is a perspective view of a pneumatic driving tool having a drive bit for securing a rivet.
Figure 17:
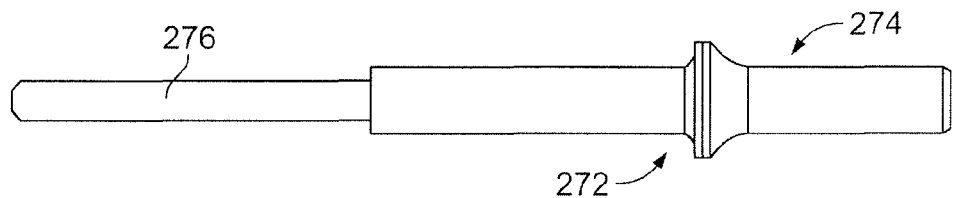
FIG. 17 is a side elevation view of the drive bit of FIG. 16 showing a collet end for securing with the pneumatic driving tool.

The guide block 32 may also be used with a pneumatic driver 270, shown in FIG. 16, having a drive bit 272, also shown in FIG. 17. As shown, the drive bit 272 has a collet or chuck end 274 for use with keyless, spring-type driver chucks, known in the art, and a drive rod 276 for contacting and driving the rivet 18. Prior use of pneumatic drivers resulted in rapid deterioration and damage to prior deformable and/or soft polymeric (rubber) guide blocks. As the present guide block 32 is generally rigid having pilot holes 34 slightly larger than the rivets 18, the rapid driving of the rivet 18 does not damage the guide block 344. The guide membrane 38 easily allows the rapid driving of the rivet 18 without significant damage. Furthermore, the guide assembly 30 can be repaired or refurbished should the life of the guide membrane 38 be expended by simply removing the screws 120. In contrast, the prior guide blocks are useless once damaged.

Figure 18:
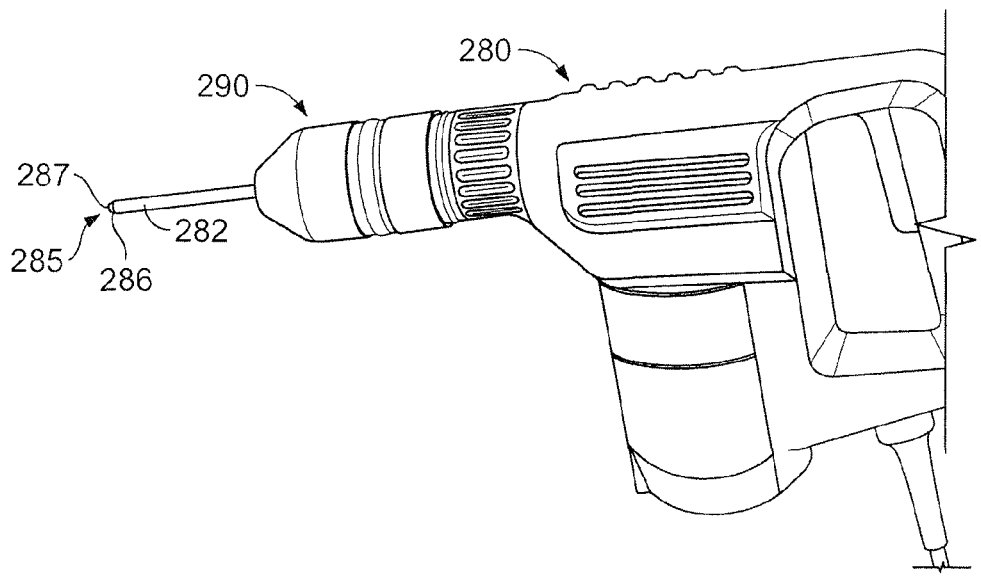
FIG. 18 is a perspective view of an electric driving tool having a drive bit for securing a rivet.
Figure 19:
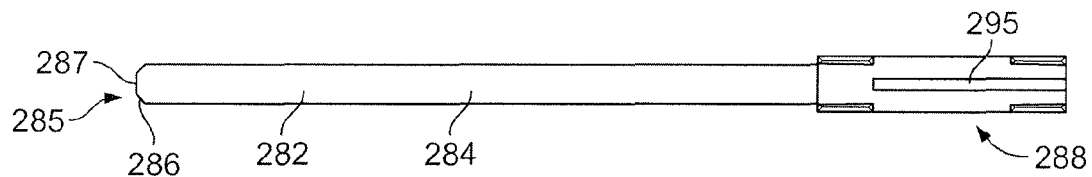
FIG. 19 is a side elevation view of the drive bit of FIG. 18 showing a slotted chuck end for securing with the electric driving tool.

Referring to FIGS. 18-19, an electric driver 280 with a drive bit 282 may be used with the guide assembly 30. Prior non-manual drivers generally consisted of various pneumatic drivers. As discussed above, pneumatic drivers present a number of problems as they require a source of compressed gas (air), which is not always possible or safe in some environments, and requires transport of the compressor and tank for holding the compressed gas. In contrast, the electric driver 280 requires only a source of electricity, which is relatively accessible in most environments. Alternatively, the electric driver 280 may have a battery (deep-cell battery) and transformer for providing the requisite power.

It should be noted that electric drivers or hammers are known. These tools typically are high-powered, having a wattage rating in excess of 1000 W. Therefore, electric drivers are typically rated as demolition only. That is, they are not used for driving nails, like a hand hammer would be used, instead being used either to break a structure apart, to drill into a structure, or to tamp down a material.

With this common and believed to be exclusive use, electric hammers have not previously been used for securing rivets. Instead, bits used with the electric hammers have been used for the above-identified purposes. More specifically, electric hammer bits have generally consisted of a chuck end for being secured with the electric hammer, an elongated shaft extending from the chuck end, and a bit tip at the end of the shaft. Common bits are cutter bits, chisel or spade bits, fluted tips for drilling, or piercing bits including bull tips or circular, tapered bits. Accordingly, adaptation of an electric hammer for the present novel use, specifically securing rivets with a belt and belt fastener, requires a heretofore non-existent drive bit 282.

The drive bit 282 has an elongated drive rod 284 for contacting and driving the rivet 18 at a tip 285, a peripheral edge 286 of which is beveled and a terminal surface 287 of which is generally non-cutting, such as generally flat, slightly convex, or slightly concave. The drive rod 284 has a diameter sized in a manner similar to the drive rods of the other drivers discussed herein and sized to be received within the guide block pilot holes. The drive rod 284 is generally cylindrical with a generally smooth exterior to minimize contact damage against a guide such as the guide blocks discussed herein. The drive rod tip 285 has the beveled edge 286 to promoted driving force being directed through the center of the rivet 18 during driving. The drive bit 282 also has a slot 295 in a chuck end 288 for securing with a driver chuck 290 of the electric driver 280. It should be noted that the chuck end 288 may have other structure for cooperating with driver chucks of various electric drivers or hammers provided by different manufacturers.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A driving tool for securing rivets with a belt and a belt fastener, the driving tool comprising:
    a head for receiving driving impact including a cap, an anvil and an inner cavity;
    a plurality of drive rods each having an upper portion, each drive rod depending from the head and having a predetermined arrangement corresponding to a predetermined arrangement of rivet holes in the belt fastener;
    a handle connected to the head and extending therefrom for manipulating the driving tool; and an inner mounting portion receivable in the cap inner cavity and having a plurality of throughbores for respectively receiving the upper portions therethrough, wherein each upper portion includes an enlarged head that is interference fit with the inner mounting portion.

2. The driving tool of claim 1, wherein the cap and mounting portion are generally rigid, and the mounting portion is press-fit within the cap inner cavity.

3. The driving tool of claim 1, wherein the mounting portion has a recess on a top surface thereof, the recess being adapted to receive the drive rod head enlarged portion.

4. A driving tool for securing rivets with a belt and a belt fastener, the driving tool comprising:

a head for receiving driving impact including a cap, an anvil and an inner cavity;

a plurality of drive rods each having an upper portion, each drive rod depending from the head and having a predetermined arrangement corresponding to a predetermined arrangement of rivet holes in the belt fastener;

a handle connected to the head and extending from the head for manipulating the driving tool; and an inner mounting portion receivable in the cap inner cavity and having a plurality of throughbores for respectively receiving the upper portions therethrough, wherein the cap and mounting portion are formed of metal, and the inner mounting portion is press-fit within the cap inner cavity.

\* \* \* \* \*